United States Patent
Zwettler (12)

(10) Patent No.: US 6,293,043 B1
(45) Date of Patent: Sep. 25, 2001

(54) FISH STRIKE ALARM WITH FISHING ROD HOLDER

(76) Inventor: Ernst Zwettler, 27520 Enterprise Cir. West, Temecula, CA (US) 92590

( * ) Notice: Subject to any disclaimer, the term of this patent is extended or adjusted under 35 U.S.C. 154(b) by 0 days.

(21) Appl. No.: 09/365,479

(22) Filed: Aug. 2, 1999

(51) Int. Cl.[7] ................................................ A01K 97/12
(52) U.S. Cl. ................................................................ 43/17
(58) Field of Search ............................................ 43/16, 17

(56) References Cited

U.S. PATENT DOCUMENTS

| | | | |
|---|---|---|---|
| D. 217,452 | 5/1970 | Jett | D22/148 |
| 522,352 | * 7/1894 | Poppowitsch | 43/17 |
| 834,414 | 10/1906 | Schmidt, Jr. | 43/15 |
| 2,446,427 | * 8/1948 | Linder | 43/17 |
| 2,574,333 | * 11/1951 | Kuczynski et al. | 43/17 |
| 2,843,962 | 7/1958 | Portor | 43/15 |
| 2,858,635 | * 11/1958 | Haeusler | 43/17 |
| 2,922,243 | * 1/1960 | Weaver et al. | 43/17 |
| 2,948,076 | 8/1960 | Patricello | 43/17 |
| 2,964,869 | * 12/1960 | Berghoff et al. | 43/17 |
| 3,228,135 | * 1/1966 | Kricksfeld et al. | 43/17 |
| 3,371,443 | 3/1968 | Dobson | 43/17 |
| 3,559,327 | 2/1971 | Christopher | 43/17 |
| 3,680,244 | 8/1972 | Cala | 43/17 |
| 3,707,801 | 1/1973 | Gednalske | 43/17 |
| 3,711,847 | 1/1973 | Barrows | 43/17 |
| 3,835,568 | * 9/1974 | Whitfield | 43/17 |
| 3,913,255 | * 10/1975 | Fillmen | 43/17 |
| 3,999,323 | 12/1976 | Vitucci | 43/17 |
| 4,020,578 | * 5/1977 | Hope | 43/17 |
| 4,376,349 | 3/1983 | Yarczower | 43/17 |
| 4,398,185 | * 8/1983 | Roberts, Sr. | 43/17 |
| 4,447,979 | 5/1984 | Taylor | 43/17 |
| 4,458,437 | * 7/1984 | Ou | 43/17 |
| 4,471,554 | * 9/1984 | Heiskell | 43/17 |
| 4,633,608 | 1/1987 | Savarino | 43/17 |
| 4,794,719 | 1/1989 | Rabino | 43/17 |
| 4,908,973 | 3/1990 | Perks | 43/17 |
| 5,058,308 | 10/1991 | Girard | 43/17 |
| 5,187,892 | * 2/1993 | Gutierrez | 43/17 |
| 5,349,775 | 9/1994 | Mondares | 43/21.2 |
| 5,355,610 | * 10/1994 | Sizemore et al. | 43/17 |
| 5,396,726 | 3/1995 | Zepeda, Sr. | 43/17 |
| 5,501,027 | 3/1996 | Acker | 43/17 |
| 5,570,532 | 11/1996 | Shaffer et al. | 43/17 |
| 5,758,449 | * 6/1998 | Munsterman et al. | 43/17 |
| 5,867,931 | * 2/1999 | Morris et al. | 43/17 |
| 5,894,691 | * 4/1999 | Zepeda, Sr. | 43/17 |
| 5,986,552 | * 11/1999 | Lyons | 43/17 |

* cited by examiner

*Primary Examiner*—Darren W. Ark
(74) *Attorney, Agent, or Firm*—Calif Tervo

(57) ABSTRACT

Fish strike alarm and fishing rod holder (10) comprises sleeve (16) for receiving handle (101) of fishing rod (100), housing (20), electrical alarm circuit (60) mounted to housing (20) for sounding an audible alarm when closed, and trigger (40). Trigger (40), adapted to close alarm circuit (60) in response to tension in fishing line (104), is both pivotal between an open position and a closed position and reciprocally slidable between a temporary-alarm setting and a continuous-alarm setting. In the temporary-alarm setting, tension in line (104) causes trigger (40) to move to the closed position, line (104) is released, and trigger (40) returns to the open position. In the continuous-alarm setting, tension in line (104) causes trigger (40) to move to the closed position, the line is released, and trigger (40) remains in the closed position. Support stake (12) supports alarm (10) such that rod (100) is supported in an operable position. The portion of line (104) used to activate trigger (40) is fed back to trigger (40) from first guide (102F) on rod (100) above reel (103).

13 Claims, 1 Drawing Sheet

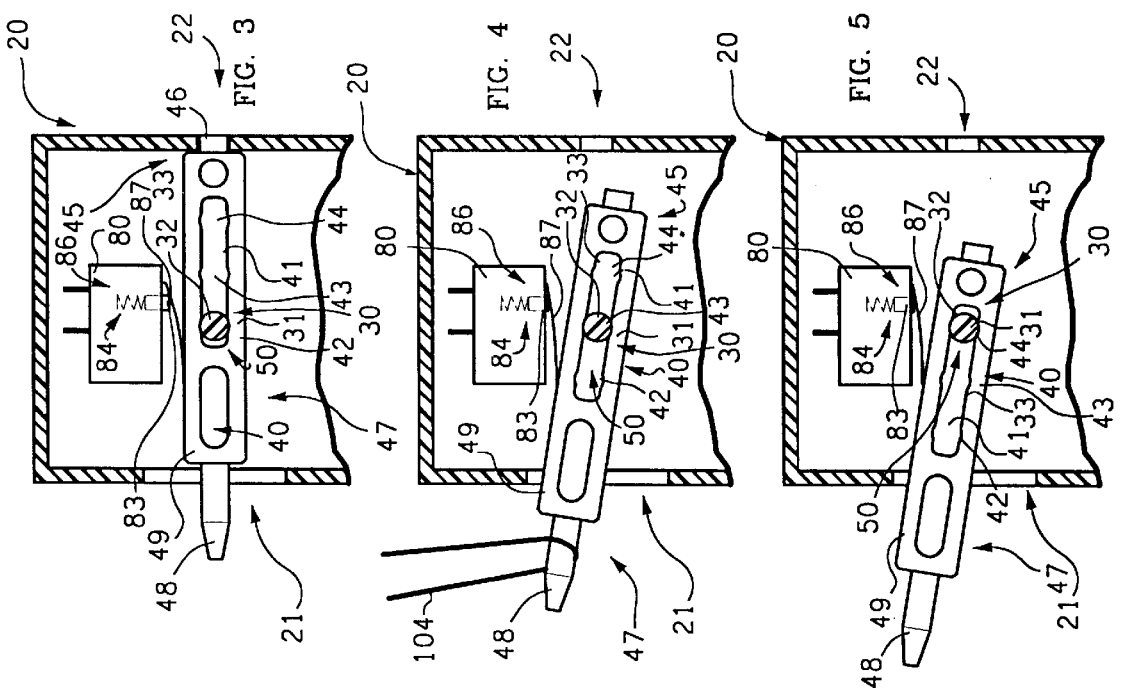
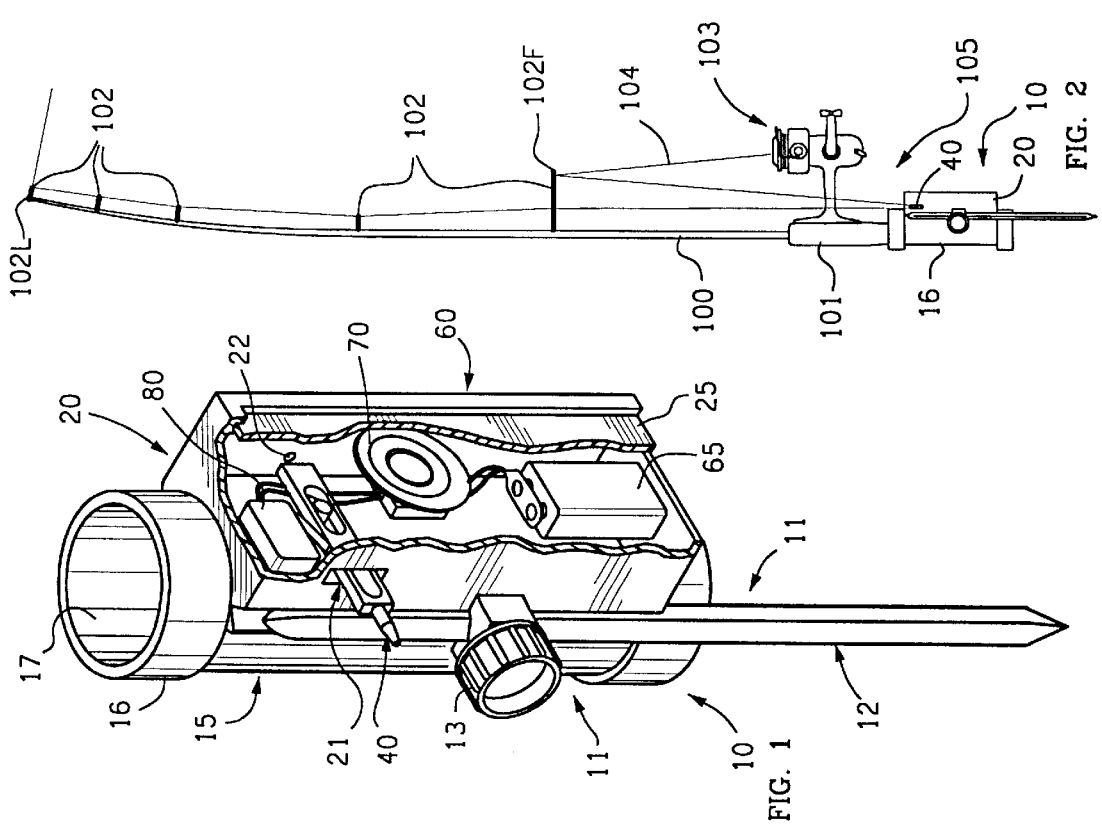

FISH STRIKE ALARM WITH FISHING ROD HOLDER

FIELD OF THE INVENTION

This invention relates generally to signal devices which indicate when a fish has struck a baited line, and more particularly to an electrically powered alarm which is triggered by tension in a fishing line and then provides slack line for hooking the fish.

BACKGROUND OF THE INVENTION

Fishing often requires patience and vigilance. Many fishers who would prefer not to commit total concentration and attention to one particular fishing line often resort to alarm or signalling devices which announce the presence of a fish on the line. These devices allow the fisher's attention to wander or to be divided among many lines at once, without the fear of a large fish getting away or an unattended line being pulled into the water by a strong fish.

Fish bite signalling devices are typically activated by tension in the fishing line caused by the fish taking the bait. Many such devices in the prior art are lacking in many respects. First, most prior art devices retain the fishing line after they are activated. Retaining the line after the device has been activated causes undue stress and wear on the line. Second, most prior art devices do not provide enough slack in the line to hook many fish reliably. Many fishes require some slack in the line to get hooked.

Lastly, the prior art devices do not offer the user the flexibility of a temporary-alarm setting in addition to a continuous-alarm setting. While a continuous alarm may be more reliable in alerting some inattentive fishers under certain circumstances, an audible alarm in a continuous-alarm setting requires action on the fisher's part to deactivate the alarm and may scare many fish away from the area. A temporary-alarm setting, on the other hand, in which the alarm sounds only temporarily and the fisher does not need to take action to deactivate the alarm is more convenient in many circumstances.

There has been a need, therefore, for a fish strike alarm which releases the line when a fish strikes, offers sufficient slack in the line to hook the fish reliably, and is capable of operating in both a temporary-alarm setting and a continuous-alarm setting. A fish strike alarm meeting these needs should be easy to use and should consistently provide a dependable alarm without causing undue wear of the fishing line.

SUMMARY OF THE INVENTION

This invention is a fish strike alarm and it generally comprises a sleeve for receiving the handle of a fishing rod, a housing connected to the sleeve, an electrical alarm circuit mounted to the housing, a trigger adapted to activate the alarm circuit in response to tension in the fishing line, and a support stake for supporting the alarm such that the fishing rod is supported in an operable position.

In use, the fishing rod handle is inserted into the sleeve and the alarm is set by looping the fishing line around the trigger. A predetermined amount of tension in the fishing line, commensurate with a fish taking the bait, causes the trigger to move, activating a switch which closes the alarm circuit, thereby sounding an alarm. In an exemplary embodiment, the trigger is both pivotal between an open position and a closed position and reciprocally slidable between a temporary-alarm setting and a continuous-alarm setting. When the trigger is in the open position, the alarm circuit is open; when the trigger is moved to the closed position by tension in the line, the alarm circuit is closed causing an audible alarm to sound.

When the trigger is in the temporary-alarm setting, tension in the line causes the trigger to move to the closed position, the line is released, and the trigger returns to the open position. The alarm is thus only sounded temporarily while the trigger is in the closed position. When the trigger is in the continuous-alarm setting, however, tension in the line causes the trigger to move to the closed position, the line is released, but the trigger remains in the closed position. The alarm, therefore, sounds continuously until the fisher manually moves the trigger to the open position.

In the preferred embodiment, the line used to activate the trigger is fed back to the trigger from the first guide on the fishing rod above the reel. This method of setting the alarm provides a loop of slack line which is useful in hooking the fish.

Other features and many attendant advantages of the invention will become more apparent upon a reading of the following detailed description together with the drawings in which like reference numerals refer to like parts throughout.

BRIEF DESCRIPTION OF THE DRAWINGS

FIG. 1 is a partially cut-away perspective view of the fish strike alarm of the invention.

FIG. 2 is a side elevation view of the fish strike alarm attached to a fishing rod and reel combination in use.

FIG. 3 is a cross-sectional view of the housing showing the switch and the trigger in the locked setting.

FIG. 4 is a cross-sectional view of the housing showing the switch and the trigger in the temporary-alarm setting.

FIG. 5 is a cross-sectional view of the housing showing the switch and the trigger in the continuous-alarm setting.

DETAILED DESCRIPTION OF THE INVENTION

With reference now to the drawings, and particularly FIGS. 1 and 2 thereof, FIG. 1 is a partially cut-away perspective view of the fish strike alarm 10 of the invention, and FIG. 2 is a side elevation view of the fish strike alarm 10 attached to a fishing rod 100 and reel 103 combination in use.

Fish strike alarm 10 is adapted for use with a fishing rod 100 and reel 103 combination as shown in FIG. 2. Reel 103 holds a supply of line 104 and rod 100 includes a series of guides 102 spaced along its length for guiding line 104 from reel 103 to a position on rod 100 distal reel 103. Line 104 is fed from reel 103 through first guide 102F, closest to reel 103, then through the remaining guides 102 until it leaves rod 100 at last guide 102L.

Alarm 10 generally comprises a housing 20, connecting means 15 for connecting housing 20 to fishing rod 100 during use, an electrical alarm circuit 60, a trigger 40 which operates to close alarm circuit 60, and support means 11 for supporting alarm 10 such that fishing rod 100 is supported in an operable position.

Connecting means 15, such as sleeve 16, are provided for connecting housing 20 to fishing rod 100. Other connecting means 15, such as clips, adhesives, straps, or other fasteners, are contemplated but not shown. Sleeve 16 is connected to housing 20 and has a top opening 17 adapted to receive the end of fishing rod handle 101 and to support rod 100 in an upright position during fishing operations. Support means 11, such as ground stake 12, for supporting alarm 10 and fishing rod 100 in an operable position, may be attached either to housing 20 or to sleeve 16. In the preferred embodiment shown in FIG. 1, ground stake 12 is slidably adjustable either to penetrate deep into the ground or to accommodate a fishing rod 100 with a very long handle 101. Ground stake 12 is locked into position by tightening knob 13, which, when tightened, prevents stake 12 from sliding relative to housing 20 and sleeve 16. Other support means 11, such as straps, clips, screws, bolts, and other fasteners are contemplated to support alarm 10 and fishing rod 100 in situations where use of ground stake 12 would be inappropriate, such as on a boat, pier, or dock.

Sleeve 16 and housing 20 are preferably constructed of injection molded plastic, glass fiber composite, or similar light-weight, strong, and weather resistant material. In the preferred embodiment, sleeve 16 is integral with housing 20, but other methods of rigidly attaching sleeve 16 to housing 20, such as with screws, rivets, other fasteners, or adhesives, are also contemplated.

Electrical alarm circuit 60 is mounted to housing 20 and operates to produce an audible alarm when a fish has taken baited line 104. Alarm circuit 60 includes a speaker or enunciator 70 and a switch 80, each electrically connected to a power source 65. Power source 65 is attached to housing 20 by mounting means, such as battery clips or other fasteners, and is preferably a typical 9-volt battery, as is commonly used for small electrical circuits. Enunciator 70 is also attached to housing 20 by mounting means, such as screws or other fasteners, and provides an audible alarm when alarm circuit 60 is closed by switch 80 and power is supplied to enunciator 70.

As can best be appreciated in FIGS. 3–5, switch 80 is rigidly attached to housing 20 and cooperates with the movement of trigger 40 to close alarm circuit 60 when a hooked fish creates sufficient tension in line 104. Preferably, switch 80 includes switch opening means 86, such as outward biased plunger 83, for opening switch 80 such that enunciator 70 will not sound an alarm unless switch 80 is activated by movement of trigger 40. In use, spring 84 operates to bias plunger 83 in the outward, or open, position (down in FIGS. 3–5) such that alarm circuit 60 is open and enunciator 70 does not receive electrical power when trigger 40 is in the open position.

Turning now to the specific operation of switch 80 and trigger 40, FIG. 3 is a cross-sectional view of housing 20 showing switch 80 and trigger 40 in the locked setting, FIG. 4 is a cross-sectional view of housing 20 showing switch 80 and trigger 40 in the temporary-alarm setting, and FIG. 5 is a cross-sectional view of housing 20 showing switch 80 and trigger 40 in the continuous-alarm setting.

Housing 20 serves as a mount for trigger 40 and alarm circuit 60, including switch 80. Housing 20 generally includes a trigger aperture 21 through which trigger 40 projects for engaging line 104, a trigger lock aperture 22 for engaging trigger lock nipple 46 when trigger 40 is in the locked setting, and a cover 25, shown partially cut away. Cover 25 may be hinged, slidable, or otherwise removable such that trigger 40 or alarm circuit 60 or its elements may be serviced or replaced. Cover also includes an alarm aperture (not shown), such that an audible alarm emitted by enunciator 70 is not muffled by cover 25.

Trigger 40 generally includes an interior end 45 disposed on the interior of housing 20 and an exterior end 47 adapted to project exterior of housing 20 through trigger aperture 21. Interior end 45 includes a lock nipple 46 and exterior end 47 includes line engagement projection 48. Trigger also includes a switch actuator surface 49 disposed adjacent switch 80 for activating switch 80.

Trigger 40 is connected to housing 20 so as to be moveable between an open position (shown in FIG. 3) and a closed position (shown in FIGS. 4 and 5). Trigger 40 is adapted, at line engagement projection 48, to engage a portion of line 104 such that a predetermined tension in line 104, as would be commensurate with a fish strike, causes trigger 40 to move to the closed position.

Preferably, trigger 40 is attached to housing 20 by means of a pivotal connection 30, such as at pivot 31. Housing pivotal bearing surface 32 and trigger pivotal bearing surface 33 cooperate such that trigger 40 is pivotal between the open position and the closed position.

In the preferred embodiment shown in FIGS. 3–5, trigger adjustment means 50, such as trigger slot 41, is used for selectively setting trigger 40 between three different positions. FIG. 3 shows trigger 40 in a locked setting wherein trigger 40 cannot move to the closed position. FIG. 4 shows trigger 40 in a temporary-alarm setting wherein trigger 40 is sufficiently biased to return to the open position after being moved by line 104 to the closed position. FIG. 5 shows trigger 40 in a continuous-alarm setting wherein trigger 40 is not sufficiently biased to return to the open position after being moved by line 104 to the closed position.

Trigger slot 41 serves as an elongate trigger pivotal bearing surface 33 and includes a plurality of detents, such as lock detent 42, temporary-alarm detent 43, and continuous-alarm detent 44. Trigger slot 41 is manually reciprocally slidable on pivot 31 such that housing pivotal bearing surface 32 is selectively detained in detents 42,43, 44, thereby detaining trigger 40 in the locked setting, the temporary-alarm setting, or the continuous-alarm setting, respectively.

When alarm 10 is not in use, trigger 40 is detained the locked setting (shown in FIG. 3) wherein housing pivotal bearing surface 32 is engaged in lock detent 42 and trigger lock nipple 46 is engaged in trigger lock aperture 22 in housing 20, preventing trigger 40 from pivoting to the closed position. Trigger 40 is shown in the open position and plunger 83 is biased in the open position by spring 84.

In use with trigger 40 in the temporary-alarm setting, housing pivotal bearing surface 32 engages temporary-alarm detent 43. Friction at pivotal connection 30 in this configuration is minimal, and trigger 40 is sufficiently biased by gravity, hinge spring 87, or plunger 83 to return automatically to the open position. In use with trigger 40 in the continuous-alarm setting, housing pivotal bearing surface 32 engages continuous-alarm detent 44. Friction at pivotal connection 30 in this configuration is sufficient to retain trigger 40 in the closed position. Other trigger adjustment means 50 for selectively setting the operation of trigger 40, such as adjustable springs or tightening knobs for varying friction at pivotal connection 30, are contemplated but not shown.

To set alarm 10, a trigger setting is selected by sliding trigger 40 such that housing pivotal bearing surface 32 engages either temporary-alarm detent 43 or continuous-alarm detent 44, and fishing line 104 is looped around line engagement projection 48 as shown in FIG. 4 such that tension in line 104 pulls line engagement projection 48 upward. Preferably, the portion of line 104 used to engage trigger 40 at line engagement projection 48 is fed back to trigger 40 from the first guide 102F on rod 100 above reel 103 as shown in FIG. 2. Such a method of setting alarm 10 provides a loop of slack 105 which is useful in hooking many types of fishes which require some slack in order for the hook to set.

In use, a predetermined tension in line 104, as would be commensurate with a fish pulling on line 104, causes external end 47 of trigger 40 to move upward such that trigger 40 pivots to the closed position where line 104 is released by sliding off the end of engagement projection 48. The release of line 104 prevents unwanted stress which may damage line 104 or lead to premature failure. Also, since tension in line 104 is no longer transmitted to trigger 40 upon release, it is preferable to release line 104 in order to allow trigger 40 to return to open position when in the temporary-alarm setting.

When trigger 40 moves to the closed position as in FIGS. 4 and 5, switch actuator surface 49 pushes hinged spring 87 such that hinged spring 87 depresses plunger 83, closing alarm circuit 60 and sending current to enunciator 70.

Preferably, switch opening means 86, spring hinge 87, trigger slot 41 and detents 43,44 are adapted such that trigger 40 in the temporary-alarm setting is biased to return to the open position after being moved to the closed position by line 104, but trigger 40 in the continuous-alarm setting is not sufficiently biased to return to the open position after being moved by line 104 to the closed position. For example, minimal friction between pivot 31 and temporary-alarm detent 43 allows spring hinge 87 to bias trigger 40 in the open position, whereas greater friction between pivot 31 and continuous-alarm detent 44 cannot be overcome by spring hinge 87.

Having described the invention, it can be seen that it provides a very convenient device for alerting a fisher to a fish strike. The temporary- and continuous-alarm settings provide versatility for the user of the fish strike alarm 10, and the unique operation of the trigger 40 in releasing the line 104 upon pivoting to the closed position minimizes the threat of broken or frayed lines. The preferred method of setting the alarm 10 by looping the line 104 from the first guide 102F on the rod 100 is useful in catching many types of fishes.

Although a particular embodiment of the invention has been illustrated and described, various changes may be made in the form, composition, construction, and arrangement of the parts without sacrificing any of its advantages. Therefore, it is to be understood that all matter herein is to be interpreted as illustrative and not in any limiting sense, and it is intended to cover in the appended claims such modifications as come within the true spirit and scope of the invention.

Having thus described my invention, I claim:

1. A fish strike alarm for use with a fishing rod and reel combination wherein the rod is elongate and has a front portion including a plurality of spaced line guides for guiding line including a first line guide and a back portion; and the reel holds a supply of line, is attached to the back portion of the rod and includes a front facing the line guides for dispensing the line and a back; said alarm comprising:

a housing;
   connecting means for connecting said alarm to the back portion of the fishing rod behind the reel;
   a trigger for disposition behind the reel and connected to said housing so as to be moveable between an open position and a closed position; when said trigger is engaged with a portion of the line between the reel and one of said line guides, a predetermined tension in the line causes said trigger to move to the closed position; wherein said trigger automatically releases the line upon moving to the closed position so as to put slack in the line at least equal to twice the distance between said trigger and the reel;
   trigger adjustment means for selectively adjusting said trigger between a temporary-alarm setting wherein said trigger, after being moved by the line to the closed position, automatically returns to the open position and remains there independent of further line tension or line movement and a continuous-alarm setting wherein said trigger is movable by the line from the open position to the closed position and, once so moved to the closed position, remains there independent of further line tension or line movement; and
   an electrical alarm circuit mounted to said housing including:
      an electric power source for providing current to said circuit;
      a switch electrically connected to said power source; said switch cooperating with the movement of said trigger such that said switch opens said circuit when said trigger is in the open position and said switch closes said circuit when said trigger is in the closed position; and
      an enunciator electrically connected to said power source; said enunciator adapted to sound an audible alarm when said circuit is closed by the operation of said switch.

2. The fish strike alarm of claim 1 further comprising switch opening means, integral with said switch, for opening said switch; wherein said trigger in the temporary-alarm setting is biased to return to the open position by said switch opening means.

3. The fish strike alarm of claim 2 wherein said switch opening means comprises a spring biased plunger.

4. The fish strike alarm of claim 1 wherein said connecting means includes a sleeve adapted for receiving a part of the fishing rod.

5. The fish strike alarm of claim 1 further including support means for supporting said alarm such that the fishing rod is supported in an operable position.

6. A fish strike alarm for use with a fishing rod and reel combination including a reel holding a supply of line and a rod having a plurality of guides above the reel for guiding the line from the reel to a position on the rod including a first guide closest to the reel; said alarm comprising:

a housing;
   connecting means for connecting said housing to the fishing rod;
   a trigger connected to said housing so as to be moveable between an open position and a closed position; said trigger adapted to engage a portion of the line such that a predetermined tension in the line causes said trigger to move to the closed position; wherein said trigger is further adapted to release the line upon moving to the closed position;
   trigger adjustment means pivotally mounting said trigger to said housing; said trigger adjustment means including:
   a slot in said trigger or said housing; said slot including a temporary alarm bearing and a continuous-alarm bearing; and
   a shaft on the other of said trigger or said housing; said shaft including a journal, said journal mounted in said slot and selectively slidable along said slot from said temporary alarm bearing wherein said trigger is in a temporary-alarm setting wherein said trigger returns to the open position after being moved by the line to the closed position to said continuous-alarm bearing wherein said trigger is in the continuous-alarm setting wherein said trigger does not return to the open position after being moved by the line to the closed position;

an electrical alarm circuit mounted to said housing including:

an electric power source for providing current to said circuit;

a switch electrically connected to said power source; said switch cooperating with the movement of said trigger such that said switch opens said circuit when said trigger is in the open position and said switch closes said circuit when said trigger is in the closed position; and an enunciator electrically connected to said power source; said enunciator adapted to sound an audible alarm when said circuit is closed by the operation of said switch.

7. The fish strike alarm of claim 6 wherein said connecting means includes a sleeve adapted for receiving a part of the fishing rod.

8. The fish strike alarm of claim 6, further including support means for supporting said alarm such that the fishing rod is supported in an operable position, wherein said support means includes a ground stake adapted to be driven into the ground.

9. In combination:

a fishing rod and reel combination:

said rod being elongate and including:

a front portion including:

a plurality of spaced guides for guiding line including:

a first guide; and a second guide farther from the reel than said first guide; and a back portion;

said reel being attached to said back portion of said rod, holding a supply of line and including:

a front facing said guides; and a back; and a fish strike alarm comprising:

a housing;

connecting means for connecting said housing to said fishing rod;

a trigger disposed behind said reel and connected to said housing so as to be moveable between an open position and a closed position; when said trigger is engaged with a portion of said line from between said first and said second guides, a predetermined tension in said line causes said trigger to move to the closed position; wherein said trigger automatically releases said line upon moving to the closed position so as to put slack in the line at least equal to twice the distance between said trigger and the first guide;

trigger adjustment means for selectively adjusting said trigger between a temporary-alarm setting wherein said trigger, after being moved by said line to the closed position, automatically returns to the open position and remains there independent of further line tension or line movement and a continuous-alarm setting wherein said trigger is movable by the line from the open position to the closed position and, once so moved to the closed position, remains there, independent of further line tension or line movement;

an electrical alarm circuit mounted to said housing including:

an electric power source for providing current to said circuit;

a switch electrically connected to said power source; said switch cooperating with the movement of said trigger such that said switch opens said circuit when said trigger is in the open position and said switch closes said circuit when said trigger is in the closed position; and an enunciator electrically connected to said power source; said enunciator adapted to sound an audible alarm when said circuit is closed by the operation of said switch.

10. The combination of claim 9 further comprising switch opening means, integral with said switch, for opening said switch; wherein said trigger in the temporary-alarm setting is biased to return to the open position by said switch opening means.

11. The combination of claim 10 wherein said switch opening means comprises a spring biased plunger.

12. The combination of claim 9 wherein said connecting means includes a sleeve adapted for receiving a part of the fishing rod.

13. The combination of claim 9, further including support means for supporting said alarm such that the fishing rod is supported in an operable position, wherein said support means includes a ground stake adapted to be driven into the ground.

* * * * *